June 3, 1924. 1,496,184

V. R. A. STROH

FULL STROKE MECHANISM

Filed Jan. 19, 1920

Inventor:
VICTOR R. A. STROH,
John H. Bruninga
His Attorney

Patented June 3, 1924.

1,496,184

UNITED STATES PATENT OFFICE.

VICTOR R. A. STROH, OF ST. LOUIS, MISSOURI, ASSIGNOR TO LIBERTY SYSTEMS CORPORATION, OF WILMINGTON, DELAWARE, A CORPORATION OF DELAWARE.

FULL-STROKE MECHANISM.

Application filed January 19, 1920. Serial No. 352,603.

*To all whom it may concern:*

Be it known that I, VICTOR R. A. STROH, a citizen of the United States, and residing at St. Louis, Missouri, have invented the new and useful Improvement in Full-Stroke Mechanism, of which the following is a specification.

This invention relates to full stroke mechanism and more particularly to full stroke mechanism for accounting machines.

One of the objects of this invention is to provide full stroke mechanism which is adapted to lock the operating mechanism against reverse movement when traveling in either direction.

Another object is to provide full stroke mechanism which is simple in construction, effective in its action, and cheap in manufacture.

Further objects will appear from the detail description taken in connection with the accompanying drawings, in which.

Figure 1:
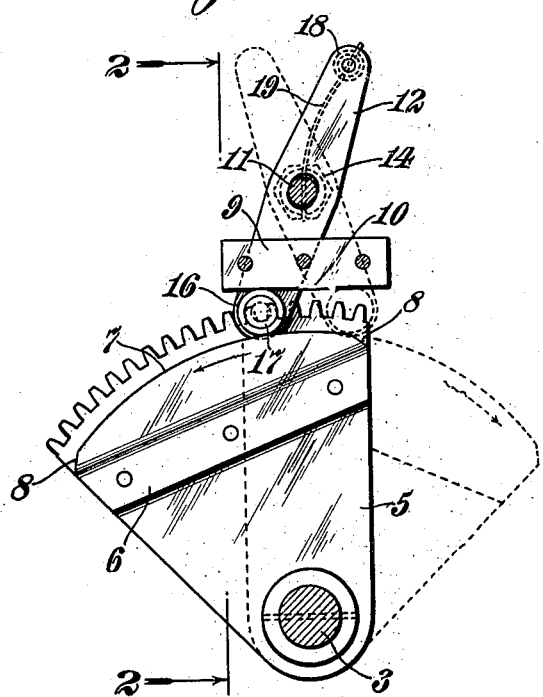
Figure 1 is a side elevation, partly in section of a full stroke mechanism embodying this invention.
Figure 2:
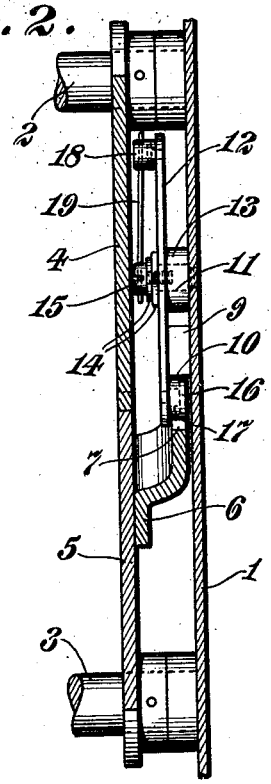
Figure 2 is a section on the line 2—2, Figure 1.

Referring to the accompanying drawings and more particularly to Figures 1 and 2, 1 designates one of the side frames or supports of any suitable machine, such as an account-finding machine illustrated in British Patent No. 153,344, which has operating shafts 2 and 3 connected with mechanism to be operated. The shafts 2 and 3 have fixed thereto segments 4 and 5 respectively, which mesh so as to cause the shafts 2 and 3 to be operated in unison. Either one of the shafts 2 or 3 may be provided with an operating handle (not shown).

Mounted on the segment 5, which forms a reciprocating member, is a segment or member 6, which is provided with a face or rim 7 and is connected with the shaft 3, the ends of the face being beveled as shown at 8. Mounted on the side frame 1, is an abutment 9 providing a face 10, which is at right angles to a line drawn from the center of the shaft 3 and a stub-shaft 11 mounted on the side frame 1. There is thus provided between the faces 7 and 10, a way or ways diverging from the center to the ends thereof.

An arm or lever 12 is mounted on the stub-shaft 11 and between a collar 13 thereon and washers 14 and a screw 15. This arm carries at its lower end, a roll or locking element 16 loosely mounted on a pin 17 on the arm. The upper end of the arm 12 carries an attachment 18 for one end of a spring 19, the other end of which passes through the head of the screw 15. This spring normally tends to hold the arm 12 vertical with the center of the roll 16 on the center line connecting the shafts 3 and 11.

In the operation of a machine of this type, the shafts 2 and 3 and the connected segments 4 and 5 are reciprocated backwards and forwards to perform what we might term the backward and forward strokes. When performing a stroke, it is desirable that this stroke be continued in one direction but to prevent reversal until the stroke has been completed. This is also desirable on the return stroke.

Assuming the segment 5 to travel in the direction of the solid arrow marked thereon, it will be noted that, at this time (the action of the spring being such as to tend to move the roll 16 to the right and into the converging way formed between the surfaces 7 and 10, while the action of the moving segment will be such as to tend to move the roll out of the way or to the left against the tension of the spring) the segment is, when moving in that direction, not restrained.

If, however, it were attempted to move the segment, at this time, in the reverse direction, the roll would tend to move into the way, thus becoming wedged and locking the segment against reverse movement. Accordingly, during the forward movement of the segment and until the stroke has been completed the segment cannot be moved back. As soon, however, as the right end of the face 7 passes the roll 16, the spring will move the arm and the roll to neutral position on a line connecting the centers of the shaft 3 and 11. The segment can now be reversed to perform the back stroke and during such stroke, the arm and roll will occupy the dotted position and will similarly prevent reversal during such back stroke, as the segment moves in the direction of the dotted arrow, at this time. Accordingly, the back stroke must be completed before the segment can again be reversed. The beveled positions 8 perform their function in causing the roll to ride up on the surface 7.

Figure 3:
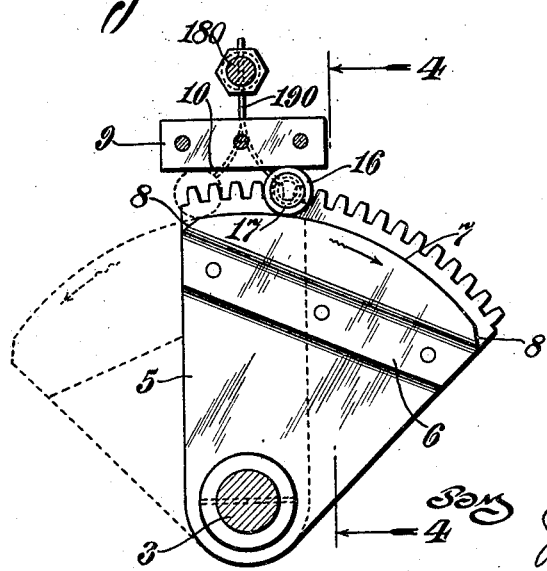
Figure 3 is a view similar to Figure 1, but showing another embodiment of this invention.
Figure 4:
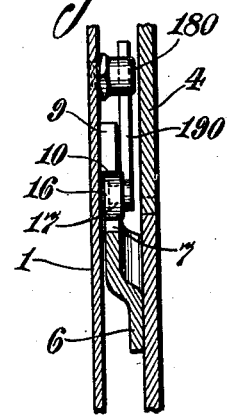
Figure 4 is a section on the line 4—4, Figure 3.

In the construction shown in Figures 3 and 4, the pin 17 of the cam roll 16 is mounted directly on a spring 190, which is fixed to a post 180 carried by the side frame 1. It will be readily understood that the action is the same as the construction shown in Figures 1 and 2.

It will, therefore, be seen that the invention accomplishes its objects. The locking member operating in the ways between the abutment and the reciprocating member, and which ways expand oppositely in the active directions of movement of the reciprocating member, operates to lock the reciprocating member against reverse movement until the stroke is completed, and this locking function is performed whether the reciprocating member travels in one or the other direction. When a stroke has been fully completed, the locking element leaves the way corresponding to that active movement of the reciprocating member, and shifts to neutral position, to be again shifted into the way corresponding to the return of active movement of the reciprocating member when the back stroke is performed. The mechanism is simple in construction and can be readily applied to various machines.

It is obvious that various changes may be made in the details of construction without departing from the spirit of this invention; it is, therefore, to be understood that this invention is not to be limited to the specific construction shown and described.

Having thus described this invention what is claimed is:

1. Full stroke mechanism, comprising, a reciprocating member, an abutment forming a way with said member, and a locking element arranged for operation in said way and adapted to leave said way when the stroke of said member is completed.

2. Full stroke mechanism, comprising, a reciprocating member, an abutment forming with said member a way which is expanded in the direction of movement of said member, and a locking element arranged for operation in said way and adapted to leave said way when the stroke of said member is completed.

3. Full stroke mechanism, comprising, a reciprocating member, an abutment forming a way with said member, and a locking element arranged for operation under tension in said way and adapted when released to leave said way when the stroke of said member is completed.

4. Full stroke mechanism, comprising, a reciprocating member, an abutment forming with said member a way which is expanded in the direction of movement of said member, and a locking element arranged for operation under tension in said way and adapted when released to leave said way when the stroke of said member is completed.

5. Full stroke mechanism, comprising, a reciprocating member, an abutment adapted to form with said member, ways which expand oppositely in the active directions of movement of said member, and a locking element arranged for operation in said way in accordance with the direction of movement of said member, and adapted to shift from one to the other way when a stroke is completed.

6. Full stroke mechanism, comprising, a reciprocating member, an abutment adapted to form ways with said member, and a locking element arranged for operation under tension in said ways, said member being adapted to permit said element to leave said ways at the end of the stroke.

7. Full stroke mechanism, comprising, a reciprocating member, an abutment adapted to form ways with said member, and a locking element arranged for operation under tension in said ways, said member being adapted to permit said element to leave said ways at the end of the stroke and to return said element to said ways at the beginning of the return stroke.

In testimony whereof I affix my signature September, 1919.

VICTOR R. A. STROH.